C. B. Wiley,
Boring Hubs.
Nº 23,535.
Patented Apr. 5, 1859.
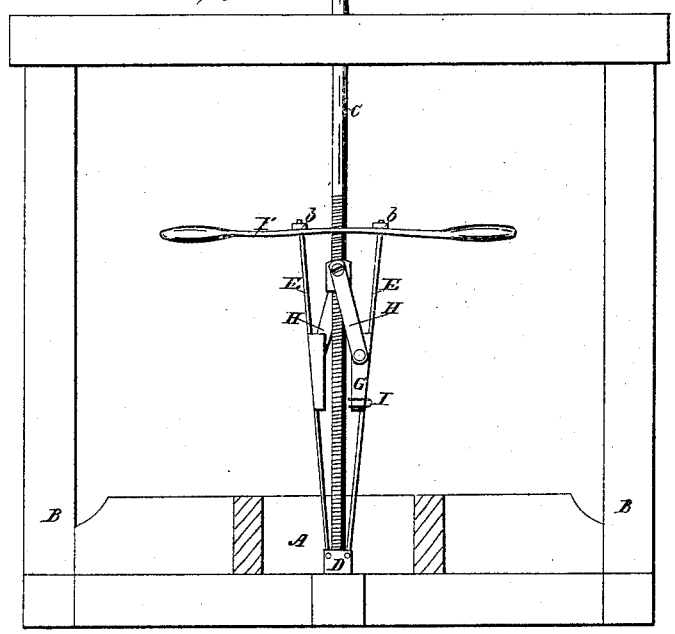
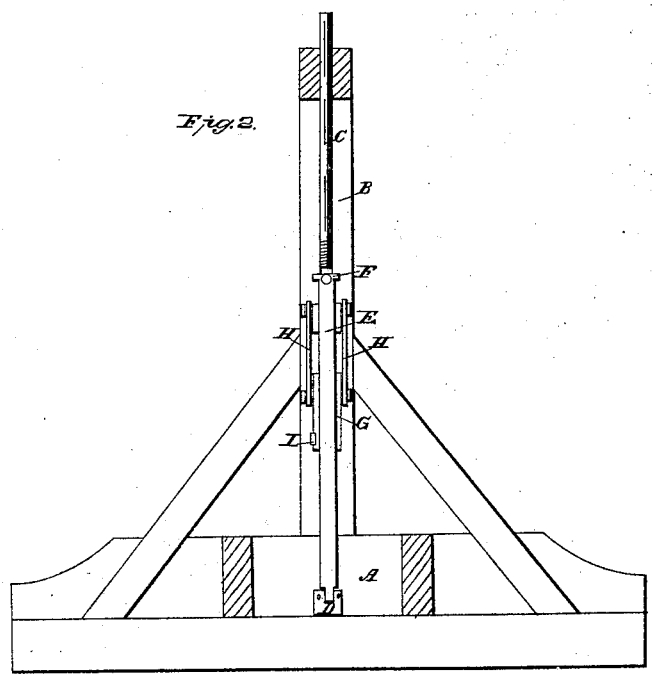
Witnesses:
Inventor:
Cutting B. Wiley

UNITED STATES PATENT OFFICE.

CUTTING B. WILEY, OF ADRIAN, MICHIGAN, ASSIGNOR TO HIMSELF, AND ALEXR. STEBBINS, OF LENAWEE COUNTY, MICHIGAN.

HUB-BORER.

Specification of Letters Patent No. 23,535, dated April 5, 1859.

*To all whom it may concern:*

Be it known that I, CUTTING B. WILEY, of Adrian, in the county of Lenawee and State of Michigan, have invented certain new and useful Improvements in Machines for Boring Hubs, the construction and operation of which I have described in the following specification and illustrated in its accompanying drawings with sufficient clearness to enable competent and skilful workmen in the arts to which it pertains or is most nearly allied to make and use my invention.

My said invention consists in the combination and arrangement of the screw having a bearing at top and bottom in the frame, with the sliding cutter heads dovetailed to the ways and attached near the top on each side to the nut, by connecting rods, by means of which the outer heads rise and fall with the nut; also the combination of the adjustable ways or slides as hereinafter more fully set forth.

In the accompanying drawings my invention is represented as follows:

Figure 1 is a vertical longitudinal section taken just in front of the cutting apparatus. Fig. 2 is a transverse section of the frame showing the cutting apparatus entire.

A is a rectangular frame resting upon the ground upon which the wheel to be bored is fastened.

B B are standards mortised into the side rails of the frame—about the middle, and supporting upon their top a cross beam or tie.

C is a screw, having a thread cut on it about two thirds of the way up, that part above the thread being turned down the size of the barrel of the screw, so as to allow the nut K to slip freely over it, when it is desired to raise the nut from the screw part.

D is a bush having an aperture through it large enough to allow it to slide freely over the screw. On the top of the bush D on each side is a mortise; fitting into this mortise are ways or slides E which are secured to the bush by a pin passing through the bush and through the ends of the ways or slides E and forming a pivot which allows the ways to be adjusted to suit the taper to be bored.

F is a cross bar with an eye in the center to allow the screw to work through it; the ends of this bar are formed into handles. Running through and lengthwise of the cross bar F are slots. The top end of the ways or slides E are turned down and a screw thread cut thereon which leaves a shoulder on the ways at the bottom of the thread; these bolts on the end of the ways pass through the slots in the cross bar, the shoulder being brought home against the cross bar by the nut on top, secures the ways firmly at the angle they are set to; by loosening the nuts *b b* the ways can be adjusted or set to suit any taper desired to be bored.

G are the cutter heads dovetailed to the ways E so as to cause them to rise and fall as the case may be by turning the nut up or down.

H H are connecting rods which connect the sliding cutter heads to the nut.

I is the cutter attached to the sliding cutter head G only one being shown in the drawing, but it is evident one or more can be used; the parts are so clearly shown in the drawings as to render a more detailed description unnecessary.

After the hole in the wheel has been roughed out so as to be a little larger than the bush D the screw C and cutting apparatus is raised up, the screw slipping through the bearing in the cross tie; the wheel is then placed upon the frame work A and fastened. The screw is then put through the hole in the hub into its bearing or step in the frame, and the bush D let down until the cutter comes in contact with the surface of the hub. The angle or taper being set, by turning the handles the cutter is caused to revolve, the feed being given by the nut. This arrangement is simple and cheap and not likely to get out of order.

The particular improvement which constitutes my said invention and which I claim as having been originally and first invented by me is—

The combination of the sliding cutter heads G with the adjustable ways or slides E with the nut K and screw C the whole being arranged as described for the purpose set forth.

CUTTING B. WILEY.

Witnesses:
WM. T. GUMBY,
R. B. ROBBINS.